(No Model.)
S. M. PERRY.
REVERSIBLE FORK AND PRONGED HOE.
No. 244,764. Patented July 26, 1881.
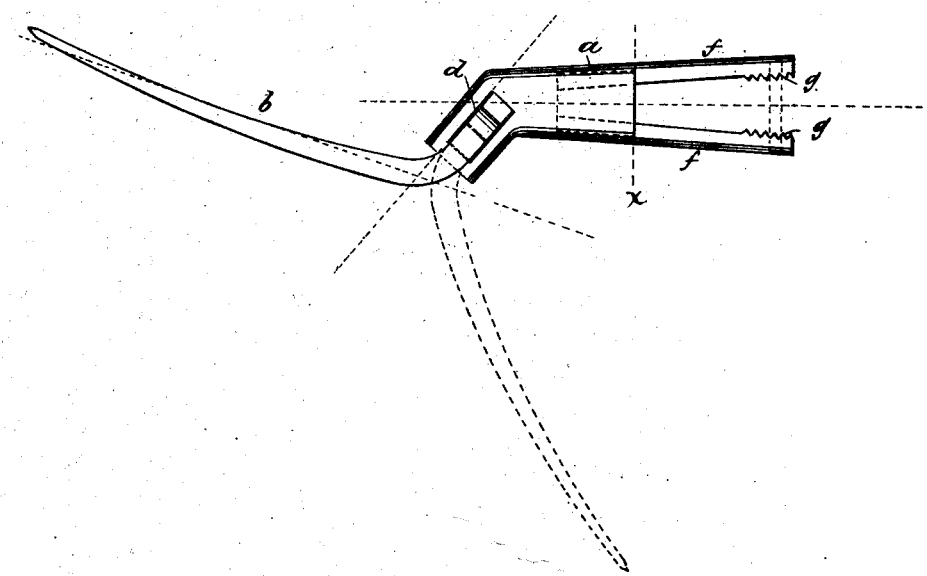
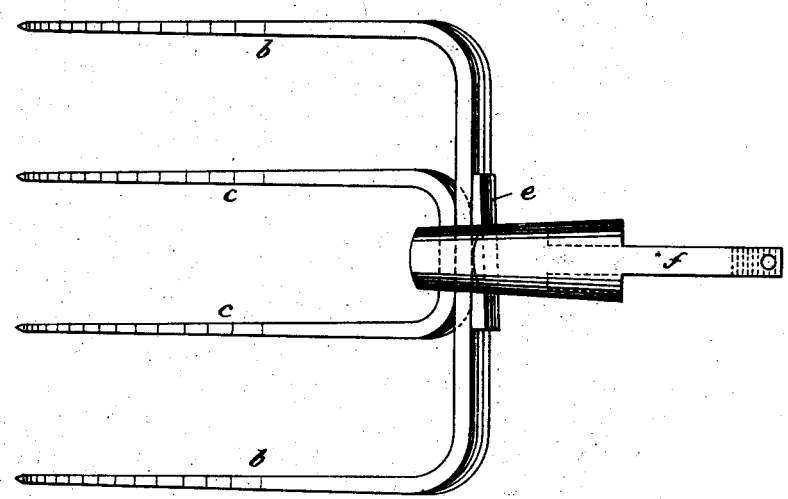
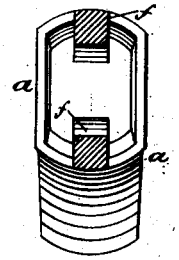
WITNESSES:
INVENTOR:

UNITED STATES PATENT OFFICE.

SAMUEL M. PERRY, OF PLAINFIELD, NEW JERSEY.

REVERSIBLE FORK AND PRONGED HOE.

SPECIFICATION forming part of Letters Patent No. 244,764, dated July 26, 1881.

Application filed October 28, 1880. (No model.)

*To all whom it may concern:*

Be it known that I, SAMUEL M. PERRY, of Plainfield, Union county, New Jersey, have invented certain new and useful Improvements in Reversible Forks and Pronged Hoes, of which the following is a specification.

My invention relates to those convertible pronged implements which may be changed from a manure-fork to a pronged hoe by shifting the position of the tines in their socket, so as to place the same either about parallel with or about at right angles to the handle.

My improvement lies mainly in the construction of the socket or shank in which the handle is inserted, and in which the changeable tines are socketed, whereby a more firm attachment of the shank to the handle is effected, but more especially in a relative construction of the shank and tines, whereby the tines are rendered changeable in their socket to form a perfect pronged hoe or a perfect manure-fork, as desired, while embodying a light, neat, and compact construction, as hereinafter fully set forth.

Figure 1 of the annexed drawings gives a side elevation of my improved tool, shown adapted as a manure-fork, the dotted lines showing the position of the tines to form a pronged hoe. Fig. 2 is a plan view of Fig. 1, and Fig. 3 is a cross-section on $x\,x$.

The tool consists, as illustrated, of the shank $a$ and the tines $b\,c$. The shank is of course fixed on the end of a long wooden handle, (not shown,) and the tines, as usual, are four in number, being made in two concentric pairs, as shown. Now, the front end of the shank is bent forward and downward at a positive inclination with the handle, or at an angle of forty-five degrees, or thereabout, and this part is perforated with an elongated slot, $d$, running horizontally through it and also inclining at an angle of forty-five degrees, or thereabout, downward and forward, as shown. The two pairs of tines are formed, as shown, of square rod-steel, their parallel prongs being tapered to sharp points, as shown, while the central cross-piece of each prong is left square and a snug fit for the inclined slot $d$ of the shank, as illustrated, so as to be incapable of turning therein. The square centers of each pair of prongs are socketed in the slot, the one pair within the other, as shown, and secured by the tapered key $e$ driven into the top of the slot, as illustrated, so that the tines are thus fixed therein in the required position. Now, it will be observed that not only is the slot $d$ of the shank inclined at an angle of forty-five degrees, or thereabout, but that the tines are so bent or curved where they spring from their central cross-bars as to raise the cross-bar above the plane of the tines, and at an obtuse angle thereto, or about forty-five degrees or more, as shown fully in Fig. 1. Hence, by this relative formation of the inclined slot with the bend or curve of the tines, the tines, when inserted in one position, as illustrated in Fig. 1, assume the correct position for a perfect pitchfork or manure-fork, where the tines are about parallel with the handle, while if reversed, as indicated by dotted lines in Fig. 1, they will assume the correct position to form a perfect pronged hoe where the tines are about at right angles to the handle. To thus reverse the prongs and change the manure-fork to the pronged hoe, it is only necessary to loosen the key $e$ and remove each pair of tines completely from the slot, then reverse them in a lateral direction—that is, placing the right tine on the left side, &c.—as shown, and replacing them in the slot and again securing them by driving in the key, when the points of the tines will now face downward, the tines being at about right angles with the handle, as illustrated by dotted lines in Fig. 1, thus forming a pronged hoe of perfect shape.

It may now be seen that while this construction practically embodies two tools in one it adds practically nothing to the expense of the tool, as no additional parts are introduced; and, moreover, the form of the shank is very simple and neat, light, and compact, and is not excessively enlarged at the front end, as is the case with similar reversible tools of this kind heretofore made, where an L-shaped slot has been formed in the front end of the shank to allow the reversing of the tines.

It will be observed that I accomplish all the desired results by a simple change in the relative form of the shank and the tines, consisting in one simple inclined slot in the shank at an angle of forty-five degrees, or nearly so, in combination with a bend in the tines, so as to raise the socketing cross-bar thereof above the plane of the tines, and at an obtuse angle thereto, or nearly so, which feature enables a manure-fork or pronged hoe to be produced, as required, and constitutes the essence of this part of my improvement.

It may be readily understood that it is not essential that the inclination of the slot $d$ and the bend in the tines be at the exact angles illustrated, for if one is inclined a little more the other may be bent a little less, or vice versa, so as to accomplish the results stated in substantially the same manner.

I prefer to construct the shank $a$ of malleable cast-iron, and this part embodies several details of construction, whereby a more firm attachment with the handle is insured. Thus it will be observed that the socket or cavity therein to receive the extremity of the handle is rounded or circular at top and bottom and flat on the two upright sides, so as to receive the end of the round wooden handle which has been first flattened on two sides, and which, being once inserted in this cavity, is thus incapable of turning therein. It may also be observed that two ribs or prongs, $f\,f$, project from the shank and extend up over the handle, being thicker than the walls of the shank, and protruding inwardly therefrom, so as to lie in grooves cut into the handle, whereby a very firm attachment of the shank to the handle is insured and the turning of the shank on the handle effectually prevented. To insure the better grasp of the prongs on the handle, one or more serrations or teeth, $g$, are formed on the inner faces thereof, preferably at the extremities, which teeth become forced into the wood of the handle when the shank is secured by a rivet passing through the prongs and handle, as indicated by dotted lines in Fig. 1.

What I claim is—

A changeable fork-hoe constructed with a shank having its front end formed with a downward and forward inclined slot at an angle of forty-five degrees, or thereabout, in combination with tines curved or bent at or near their cross-bars, substantially as described, fixable in said slot and shiftable, in the manner specified, so as to form in one position a manure-fork and in the other position a pronged hoe, substantially as herein shown and described.

SAML. M. PERRY.

Witnesses:
 CHAS. M. HIGGINS,
 JNO. E. GAVIN.